(12) United States Patent
Osako et al.

(10) Patent No.: US 7,056,249 B1
(45) Date of Patent: Jun. 6, 2006

(54) POWER TRANSMISSION BELT AND METHOD OF MANUFACTURING THE POWER TRANSMISSION BELT

(75) Inventors: Nobutaka Osako, Hyogo (JP); Akihiro Ueno, Akashi (JP); Kazuhiro Takeda, Hyogo (JP); Yasunori Nakai, Hyogo (JP)

(73) Assignee: Mitsuboshi Belting Ltd. (JP)

( * ) Notice: Subject to any disclaimer, the term of this patent is extended or adjusted under 35 U.S.C. 154(b) by 0 days.

(21) Appl. No.: 09/571,640

(22) Filed: May 15, 2000

(30) Foreign Application Priority Data

May 14, 1999 (JP) .......................... 11-133638
Jun. 28, 1999 (JP) .......................... 11-181002

(51) Int. Cl.
*F16G 1/00* (2006.01)

(52) U.S. Cl. ........................ 474/260; 474/268
(58) Field of Classification Search ................ 474/202, 474/204, 260, 266, 268, 271
See application file for complete search history.

(56) References Cited

U.S. PATENT DOCUMENTS 3,616,164 A * 10/1971 Tanimoto et al. ........... 442/358
5,234,387 A *  8/1993 Fujiwara et al. ............ 474/205
5,630,770 A *  5/1997 Fujiwara et al. ............ 417/326
6,296,588 B1 * 10/2001 Ciemniecki et al. ........ 474/268

FOREIGN PATENT DOCUMENTS

EP    0 662 571 B1    7/1995
JP    A-60-6539       1/1994

\* cited by examiner

*Primary Examiner*—Vicky A. Johnson
(74) *Attorney, Agent, or Firm*—Wood, Phillips, Katz., Clark & Mortimer

(57) ABSTRACT

A power transmission belt having a body defined by rubber and having an exposed outer surface, a fiber layer on at least a part of the exposed outer surface of the body, and a mixture including a resin adhesive ingredient, a rubber ingredient, and a lubricant that is a fluorine resin powder that is applied to the fiber layer.

15 Claims, 3 Drawing Sheets ively to that surface which is exposed on the completed belt, is bonded through an adhesive layer to rubber on the belt body. The fluorine resin may be fibrillated by a kneading step so that the fluorine resin in the rubber is not in a form that diminishes the strength of the rubber mixture. However, the fluorine resin fibrillated in the rubber mixture may not be present in a sufficient quantity at the friction generating surface to reduce the coefficient of friction to the degree desired.

POWER TRANSMISSION BELT AND METHOD OF MANUFACTURING THE POWER TRANSMISSION BELT

BACKGROUND OF THE INVENTION

1. Field of the Invention

This invention relates to power transmission belts and, more particularly, to a power transmission belt having a rubber body with an exposed outer surface and a fiber layer on at least part of the outer surface to reduce the coefficient of friction thereof.

2. Background Art

Toothed belts used for driving cam shafts and automobile injection pumps, such as timing belts, are often required to operate under severe conditions. This is particularly true in the automotive environment in which more powerful engines are being placed in more compact spaces in which the temperature may be very high. Yet, in spite of this, there is an increasing demand for belts to have even greater durability.

Toothed belts are also used for synchronized transmission in a number of industrial machines. It is generally required that the toothed belts consistently maintain accurate relative positioning of elements, often on relatively small machines over an extended time period.

The failure of toothed belts is generally classified into two types 1) rupture of the belt due to fatigue of load carrying cords; and 2) tooth chipping, often caused by overload and wear of a fiber cloth layer.

Improvements have been made which have reduced the incidence of failure of the load carrying cords. Among the improvements that have been made are: a) the use of aramid cords and high strength, relatively small diameter cords; b) use of hydrogenated nitrile rubber (H-NBR) compositions, which have excellent heat resistance properties; and c) the use of an auto tensioner for keeping belt tension constant both at startup and during operation.

Attempts have also been made to address the problem of tooth chipping. One attempted solution involves the use of cloth layers on the teeth, which cloth is made of high tension type nylon 6-6 and aramid fibers. However, this attempted solution has not been completely effective. To further improve the chip resistance of a toothed belt covered with a cloth layer, efforts have been made to decrease the frictional coefficient on the surface of the cloth.

In EPO 662571B1,there is disclosed a toothed belt in which a polymer matrix layer containing a fluorine resin is coated on the outside of a fabric layer covering the teeth, as by spraying or coating. The fluorine resin is bonded with no boundary layer in a special polymer matrix. In turn, the polymer matrix is bonded to the cloth layer. However, since the fluorine resin is firmly bonded to the polymer matrix, the fluorine resin remains surrounded by the matrix and may not adequately provide the desired effect of reducing the frictional coefficient. Further, the fluorine resin can be incorporated in only small amounts, as a result of which the polymer matrix layer is relatively thin. As a result, adequate tooth chipping resistance may not be obtainable using the fluorine resin.

In Japanese Patent Laid-Open No. 7-151190, a rubber mixture is disclosed containing fibrillated fluorine resin that is applied to a fabric layer so that the fibrillated fluorine resin is present at oppositely facing surfaces of the fabric layer and impregnates the fabric: between the oppositely facing surfaces. The surface of the cloth, facing oppositely to that surface which is exposed on the completed belt, is bonded through an adhesive layer to rubber on the belt body. The fluorine resin may be fibrillated by a kneading step so that the fluorine resin in the rubber is not in a form that diminishes the strength of the rubber mixture. However, the fluorine resin fibrillated in the rubber mixture may not be present in a sufficient quantity at the friction generating surface to reduce the coefficient of friction to the degree desired.

Further, in order to fibrillate the fluorine resin and allow it to be present in a form that does not weaken the rubber mixture, the fluorine resin can be included in amounts of only about 1 to 30 parts by weight per 100 parts by weight of rubber impregnated into the cloth. As a result, tooth chipping resistance may not be sufficient.

V-belts and V-ribbed belts used in power transmission in general industrial machines and in the automotive market commonly have a fabric attached to the back surface of the belt to both reduce friction between the belt back surface and a cooperating pulley and avoid generation of unwanted noise as the pulley contacts the back surface in operation. Ideally, wear resistance is improved, while noise generation is minimized by reducing the frictional coefficient between the fabric and a cooperating pulley. However, to date, additional improvement is sought in both of these areas.

SUMMARY OF THE INVENTION

In one form, the invention is directed to a power transmission belt having a body defined by rubber and having an exposed outer surface, a fiber layer on at least a part of the exposed outer surface of the body, and a mixture including a resin adhesive ingredient, a rubber ingredient, and a lubricant that is a fluorine resin powder that is applied to the fiber layer.

In one form, the fiber layer has a first surface which is exposed and a second surface which is applied to the body, and the mixture is applied so that at least the fluorine resin powder is present at the first and second surfaces and between fibers in the fiber layer between the first and second surfaces.

The fibers in the fiber layer may be surrounded by the mixture between the first and second surfaces.

The power transmission belt may be a V-belt (including V-ribbed belts) or a toothed belt.

In one form, at least one of the resin adhesive ingredient and the rubber ingredient is formed by drying a resorcinol-formalin-rubber latex treating liquid.

The fluorine resin powder may be present in an amount of from 30 to 200 parts by weight per 100 parts by weight of the rubber ingredient. The fluorine resin powder may be in grain form with an average grain size of no greater than 100 μm. The mixture may be present in an amount of 5% to 40% by weight of fiber in the fiber layer.

In one form, the fluorine resin powder is not bonded to either of the resin adhesive ingredient or the rubber ingredient.

The power transmission belt may further include a first rubber layer on the fiber layer, which first rubber layer consists of a rubber blend including an isocyanate compound.

The power transmission belt may have a second rubber layer on the first rubber layer, which second rubber layer has at least one of a) a fluorine resin powder and b) a second lubricant other than the fluorine resin powder.

The second lubricant may be graphite.

The rubber in the first rubber layer may be the same as the rubber in the body.

The rubber in the second rubber layer may be the same as the rubber in the body.

In one form, the body has a back portion in which at least one load carrying cord is embedded, a back surface, and an inside surface facing oppositely to the back surface. The fiber layer covers the teeth on the inside surface.

In one form, the fiber layer is at least one of a) non-woven fabric, b) knitted fabric, and c) fabric made from woven yarn made from fibers.

The invention is also directed to a method of forming a power transmission belt, which method includes the steps of: forming a body made from rubber and having. an exposed outer surface; forming a fiber layer with first and second oppositely facing surfaces on at least a part of the exposed outer surface of the body; impregnating the fiber layer with a first treating liquid including a resorcinol-formalin-rubber latex and a powdery lubricant including fluorine resin powder; drying the first treating liquid; impregnating the fiber layer with a second treating liquid including a rubber cement; drying the second treating liquid; and vulcanizing the body and the fiber layer.

The method may further include the step of causing the lubricant to be dispersed on the first and second oppositely facing surfaces and between the first second oppositely facing surfaces.

The method may further include the step of applying the fiber layer to the body before the step of vulcanizing.

The power transmission belt may be a toothed belt wherein the body includes a back portion on which at least one load carrying cord is embedded, a back surface, and an inside surface facing oppositely to the back surface, with the fiber layer covering the teeth on the inside surface.

In one form, the rubber cement is at least one of an isocyanate compound and an epoxy compound.

In one form, the fluororesin powder is present in an amount of from 30 to 200 parts by weight per 100 parts by weight of rubber latex and the resorcinol-formalin-rubber latex, and the fluororesin powder is in grain form with the average grain size being not greater than 100 µm.

The fluororesin powder may be in the form of an aqueous dispersion.

The fluororesin powder may be at least one of polytetrafluoroethylene, polytrifluoroethylene, tetrafluoroethylene-hexafluoropropylene copolymer, tetrafluoroethylene-perfluoroalkoxyethylene copolymer, and tetrafluoroethylene-ethylene copolymer.

The method may include the steps of impregnating the fiber with a third treating liquid that is a rubber cement having a fluororesin powder and a powdery lubricant other than the fluororesin powder, and drying the third treating liquid.

The powdery lubricant may be at least one of graphite, molybdenum sulfide, glass beads, ceramic powders, spherical phenolic resins, cut yarn, aramid powder, polyamide, polyester, polybenzoxazole, and paraphenylenenaphthalate.

The method may include the step of causing the lubricant to surround fibers in the fiber layer between the first and second oppositely facing surfaces.

The fiber layer may be at least one of a) non-woven fabric, b) knitted fabric, and c) fabric made from woven yarn made from fibers.

DETAILED DESCRIPTION OF THE DRAWINGS

Figure 2:
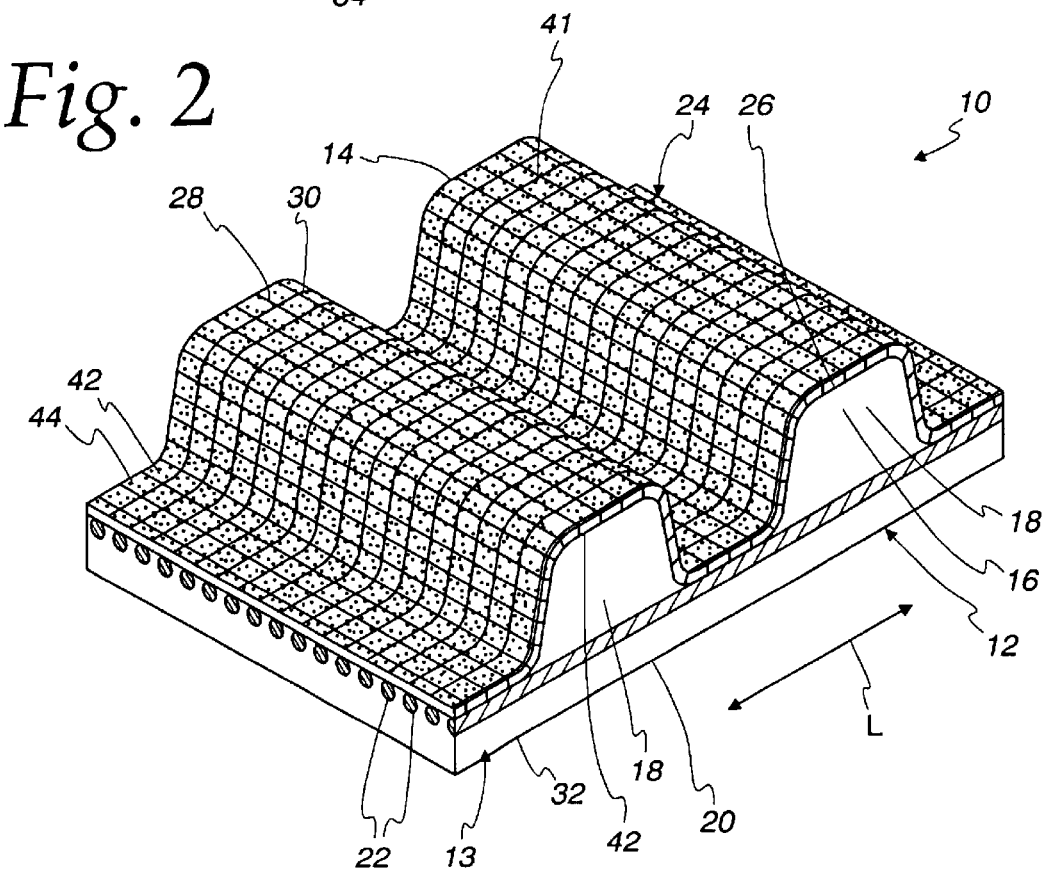
FIG. 2 is a fragmentary, perspective view of toothed belt made according to the present invention.

In FIG. 2, one form of power transmission belt, of a type suitable for incorporation of the present invention, is shown at 10. The power transmission belt 10 consists of a body 12 with an exposed peripheral surface 13. The body 12 has a longitudinal extent along the direction indicated by the double-headed arrow and laterally spaced sides, 14, 16. The body 12 further defines laterally extending teeth 18 at regular intervals along the length of the body 12. A belt back portion 20 is contiguous with the teeth 18 and has load carrying cords 22 embedded therein. A fiber/cloth layer 24 is applied on an inside surface 26 of the belt body 12 over the teeth 18. The back portion 20 and teeth 18 are formed from a rubber blend. The fiber/cloth layer 24 consists of woven warp yarns 28, extending in a lateral direction, and weft yarns 30, extending in a longitudinal direction.

In the event that the invention is utilized with a V-belt, such as a V-ribbed belt (see FIG. 5), a similar fiber/cloth layer 24 can be applied to a rubber blend which defines an exposed back surface thereof, which may be contacted by a cooperating pulley in operation. In the event of a toothed belt 10 having the configuration shown in FIG. 2, the cloth layer 22 can be provided on one or both of the inside surface 26 and back surface 32.

The fiber/cloth layer 24 may be applied to the entire exposed surface 13 or any part, or parts, thereof.

Figure 1:
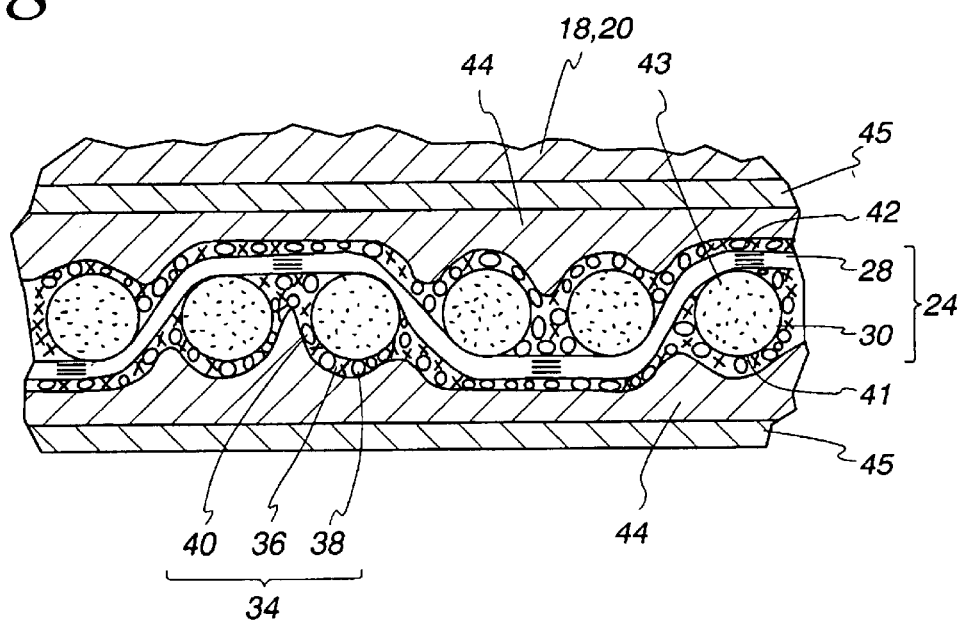
FIG. 1 is an enlarged, fragmentary, cross-sectional view of a fiber layer according to the present invention, applied to a power transmission belt body.
Figure 3:
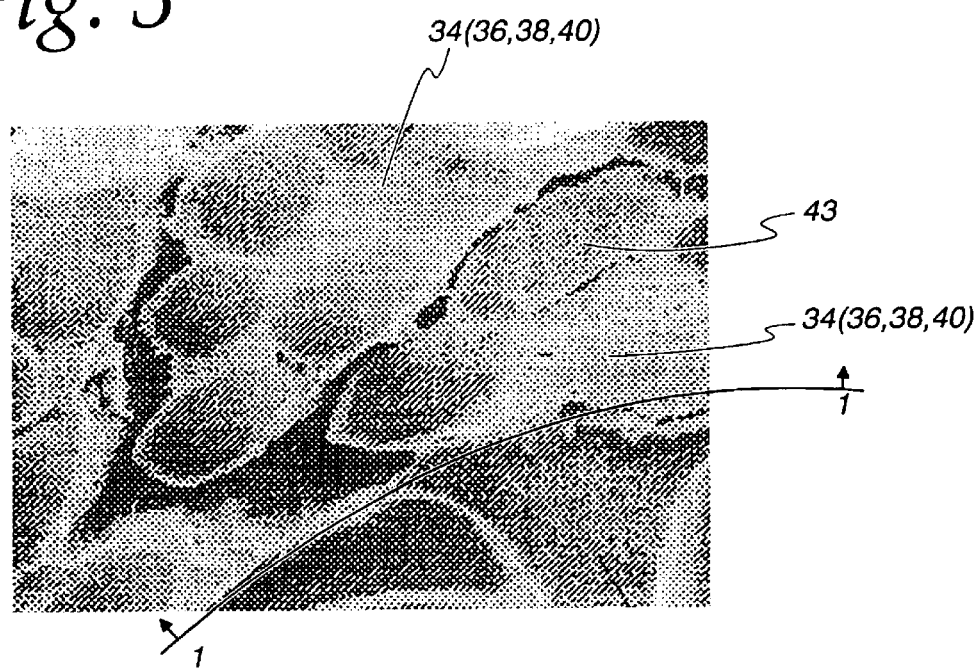
FIG. 3 is a magnified, plan view of a fiber layer, made according to the present invention, as on the toothed belt of FIG. 2.

As seen in FIGS. 1 and 3, the cloth layer is impregnated, and has deposited thereon, a mixture 34 consisting of a rubber ingredient 36, a resin adhesive ingredient 38, and a fluorine resin powder 40. The fluorine resin powder 40 is accumulated on oppositely facing surfaces 41, 42 of the fiber/cloth layer 24, with the surface 41 exposed on the completed belt 10 and the surface 42 applied to the belt body 12. The fluorine resin powder 40 is also impregnated in the fiber/cloth layer 24 so as to surround, and be present between, fiber material 43 defining the woven warp and weft yarns 28, 30. Preferably, first and second rubber layers 44, 45 respectively, are formed on the fiber/cloth layer 24.

Figure 5:
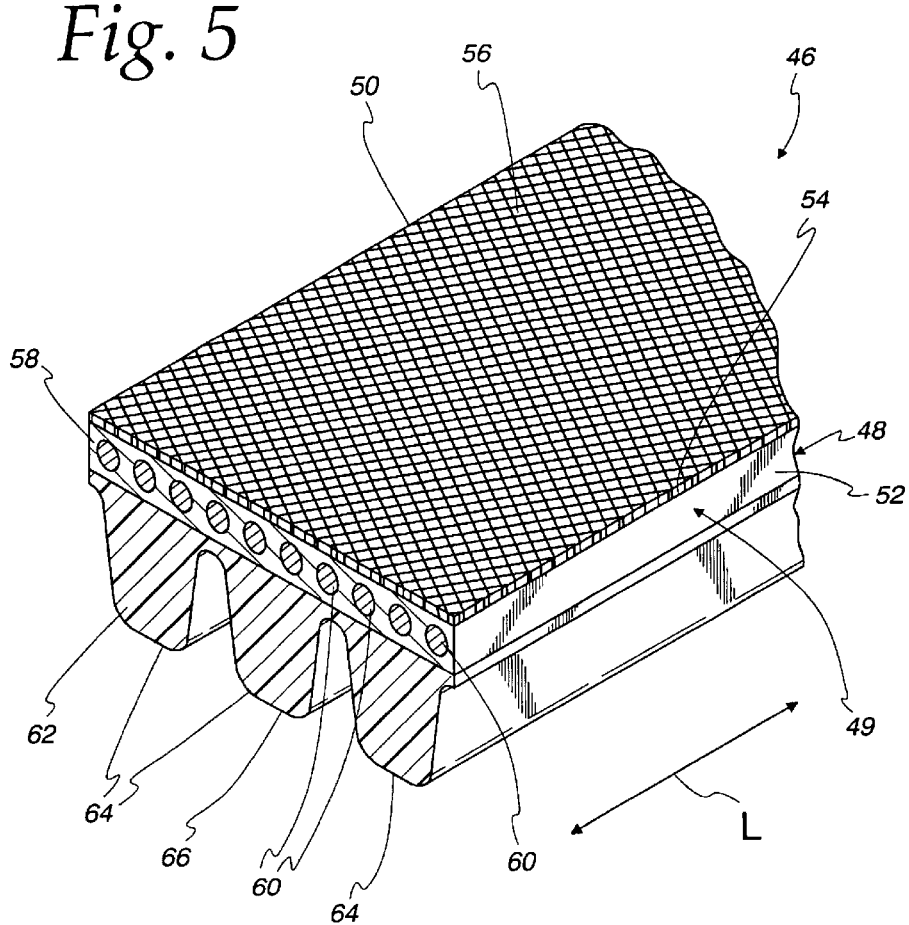
FIG. 5 is a fragmentary, perspective view of another form of power transmission belt made according to the present invention.

In FIG. 5, a V-ribbed belt, of a type suitable for incorporation of the present invention, is shown at 46. The belt 46 consists of a body 48 having a longitudinal extent, indicated by the double-headed arrow L, and an exposed peripheral surface 49, including laterally oppositely facing side surfaces 50, 52. The body 48 has an outside surface 54 which is covered by a fiber/cloth layer 56, which may have the same construction as the fiber/cover layer 24. The body 48 has a cushion rubber layer 58 with load carrying cords 60 embedded therein. A compression section 62, inside of the load carrying cords 60, is defined by an elastic layer. The compression section 62 includes three, laterally spaced, trapezoidally-shaped ribs 64, which extend lengthwise of the belt body 48.

The belt body 48 is defined by a rubber blend. In operation, the fiber/cloth layer 56, which is applied to the surface 54, contacts a pulley (not shown) which presses, and rolls, thereagainst. The fiber/cloth layer 56 may be applied to an inside surface 66, in addition to, or instead of, the surface 54. The fiber/cloth layer 56 may be applied to the entire surface 49, or any part thereof.

In the mixture 34, the rubber ingredient 36 is defined by a rubber solid obtained by heating and drying a rubber latex formed from emulsion polymerization. The resin adhesive ingredient 38 is an initial condensate of resorcinol and formalin. The rubber ingredient 36 and the resin adhesive ingredient 38 are solids which remain after drying and heating a resorcinol-formalin-rubber latex (RFL) treating liquid.

The resin adhesive ingredient 38 is adhered to the fibers 43 in the warp yarns 28 and weft yarns 30. The fluorine resin powder 40 is dispersed and mixed in a matrix consisting of the rubber ingredient 36 and the resin adhesive ingredient 38. The fluorine resin powder 40, the rubber ingredient 36, and the resin adhesive ingredient 38 are not bonded so that a gap is formed partially, or entirely, around the periphery of the fluorine resin powder 40.

This is seen clearly in FIG. 3 wherein the mixture 24, consisting of the rubber ingredient 36, the fluorine resin powder 40, and resin adhesive ingredient 38, is shown deposited on the surfaces 41, 42, and on the fibers 43 in the warp yarns 28 and weft yarns 30. The fluorine resin powder 40 accumulates at the surfaces 41, 42, and surroundingly accumulates on the surfaces of the fibers of the warp yarns 28 and weft yarns 30 and accumulates between the fibers 43 of the warp yarns 28 and weft yarns 30, to reduce the coefficient of friction between the fiber/cloth layer 24 and a cooperating surface, as on a pulley.

The fibers 43 defining the warp yarns 28 and weft yarns 30 may be one or more of nylon, aramid, polyester, polybenzoxazole, and cotton. The fibers 43 may be in the form of filament yarn or spun yarn which may be twisted yarn, a mixed twisted yarn with a single composition, or a mixed spun yarn. The fibers 43 may make up yarns of a density and diameter that permits fluorine resin powder 40, the rubber ingredient 36, and the resin adhesive ingredient 38 to migrate into the gaps between fibers.

For toothed belts, fibers of nylon, aramid, orthe like, are desired, depending upon the working environment and required service life. For V-belts and V-ribbed belts, cotton yarns or mixed yarns of cotton and polyester are preferred. Polybenzoxazole fibers, polyethylene naphthalate, and the like, are also used in environments wherein the temperature is high and/or high loads are experienced.

The fluorine resin powder 40 can be incorporated in a desired, large, quantity in any of twill weave, satin weave, and plain weave layers. To effectively deposit the mixture 24 containing the fluorine resin powder 40 on the surfaces 41, 42 and around and between the fibers 43 of the warp and weft yarns 28, 30 between the surfaces 41, 42, the diameter and the density of the yam are chosen so that the mixture 24 can form a contiguous network between the surfaces 41, 42 and around and between the fibers.

The mixture 24 is preferably formed by dipping the fibers 43 of the warp and weft yarns 28, 30 into resorcinol-formalin-rubber latex (RFL) treating liquid in which the fluorine resin powder 40 is dispersed. The fibers are then dried and heated.

The RFL treating solution is preferably a mixture of an initial condensate of resorcinol and formalin and a rubber latex, in which the molar ratio between the resorcinol and formalin is from 3/1 to 1/3 to provide the desired adhesion. The initial stage condensate of resorcinol and formalin is mixed with the rubber latex so that the resin component is from 5 to 50 parts by weight per 100 parts by weight of the rubber in the rubber latex.

One or more of styrene-butadiene-vinyl pyridine ternary copolymer (VP), styrene-butadiene copolymer (SBR), chloroprene CR), acrylonitrile-butadiene copolymer (NBR), hydrogenated NBR (H-NBR), chlorosulfonated polyethylene (CSM), and natural rubber, can be used for the rubber latex in the rubber ingredient 36.

In the event that the toothed belt is designed for use in the automotive environment, the temperature is at 100° C. or higher, and a running life of 150,000 km is desired, H-NBR is preferred for the belt body 12. Long life can be realized by using a blend consisting of a latex of H-NBR, CSM, and VP. latex for the RFL treating liquid to be deposited upon, and impregnate, the fiber/cloth layer 24, 56.

On the other hand, for V-belts used in general industrial machines and having a body made from natural rubber or SBR, VP latex, SBR latex, or a blend thereof can be used for the RFL treating liquid to impregnate, and cover, the. fiber/cloth layer 24, 56.

The fluorine resin powder 40 is preferably not bonded to the rubber ingredient 36. The resin adhesive ingredient 38 is preferably one, or a combination of, polytetrafluoroethylene, polytrifluoroethylene, tetrafluoroethylene-hexafluoropropylene copolymer, tetrafluoroethylene-perfluoroalkoxyethylene copolymer, and tetrafluoroethylene-ethylene copolymer.

As the ratio of the number of fluorine atoms in the fluorine resin powder 40 increases, the coefficient of friction reduces. Thus, assuming that the materials are applied in equal amount to the fiber 43 in the warp and weft yarns 28, 30, polytetrafluoroethylene has the most significant effect in reducing the coefficient of friction and provides the longest belt life, before tooth chipping, among the fluorine resin powders 40. However, other fluorine resin powders also reduce friction substantially in proportion with the ratio of the number of fluorine atoms in the molecule.

Preferably, the fluorine resin powder 40 is present in an amount of 30 to 200 parts by weight, and more preferably 50 to 200 parts by weight, per 100 parts by weight of the rubber ingredient 36 in the RFL treating liquid, and is dispersed uniformly therein. It is also preferred that the fiber material be dipped in the treating liquid and dried to control the deposition amount of the solid mixture 34 containing fluorine resin powder 40 in the range of 5 to 40%, based on the weight of the fiber material before dipping.

If the fluorine resin powder 40 is present in an amount less than 30 parts by weight or less than 5%, the total amount of the fluorine resin powder 40 fixed to the fiber material may be insufficient to reduce the frictional coefficient to a desired degree. If the fluorine resin powder 40 is in excess of 30 parts by weight or in excess of 40%, the total amount of the fluorine resin powder 40 fixed to the fiber may significantly, adversely affect adhesion of the fiber to the belt body, thereby potentially detracting from the belt performance.

A powdery lubricant other than the fluorine resin powder 40 may also be used in the RFL treating liquid. The powdery lubricant may be, for example, one or more of a layered graphite structure, molybdenum disulfide, glass beads, ceramic powder, spheroidal phenol resin powder, as well as cut yarn or powder made from aramid, polyamide, polyester, or polybenzoxazole fibers. Of the above, graphite is particularly compatible with the rubber ingredient 36 and may significantly improve the durability of the belt.

The amount of powdery lubricant is preferably from 30 to 200 parts by weight per 100 parts by weight of the rubber ingredient 36 in the RFL treating liquid. It is preferred to increase the amount of the fluorine resin powder 40. However, there is no restriction on the mixing ratio between the fluorine resin powder 40 and the powdery lubricant.

The amount of the mixture 34 applied to the fibers 43 is determined by: 1) measuring the weight of the fiber material before dipping treatment (W1); 2) dipping the fiber material into the RFL treating liquid in which the fluorine resin powder 40 is dispersed; 3) placing the fiber material in an oven and heating the same until the weight is constant; and 4) measuring the final weight (W2). The mixture amount (%) is then determined according to the following formula: $((W2-W1)/W1) \times 100(\%)$.

To fix adequate amounts of the fluorine resin powder 40 to the fibers 43, it is preferred to use fluorine resin powder 40 which is made into a powder form by pulverization or pelletizing into an average grain size of 100 μm or less, and more preferably 10 μm or less.

If the grain size exceeds 100 μm, the fluorine resin powder settles in the RFL treating liquid, as a result of which it may be difficult to uniformly disperse the fluorine resin powder. If this occurs, the applied amount of the fluorine resin powder 40 may be less than desired over some regions of the fiber/cloth layer 24, 56, as a result of which the coefficient of friction may not be reduced to the extent desired. To avoid this situation, it is desired to use a fluorine resin powder 40 with a grain size that is as small as possible i.e. 10 μm or less.

An optional rubber cement can be deposited on the surface of the fiber materials treated with the RFL treating liquid in which the fluorine resin powder 40 is dispersed. As seen in FIG. 1, a first rubber cement, that is a rubber blend containing an isocyanate compound, is deposited as the first layer 44. A second rubber cement, having a rubber blended with a fluorine resin powder or a lubricant other than the fluorine resin powder, is deposited as the second layer 45. Alternatively, the first layer 44 can be omitted and the second rubber layer 45 can be applied to the surface of the fiber material that is treated with RFL treating liquid containing the fluorine resin powder.

As a further alternative, the second rubber layer 45, may be made as a rubber blended with an isocyanate compound, and a fluorine resin powder or a lubricant other than the fluorine resin powder to form a second rubber cement, which may be applied to the surface of the fiber material that is treated with the RFL liquid containing the fluorine resin powder.

The first rubber layer 44 functions as an intermediate layer to improve. adhesion. The isocyanate compound acts as an adhesive ingredient. Accordingly, a first rubber cement having the same type of rubber ingredient as that for the belt main body can be used. The first rubber cement may be formed by dissolving the same kind of a rubber blend as that used for the belt main body in a solvent such as methyl ethyl ketone (MEK) or toluene, adding an isocyanate compound to form a treating liquid, and coating and then solidifying the treating liquid by drying. The isocyanate compound used for the treating liquid may include, for example, at least one of 4,4'-diphenylmethane disocyanate, tolylene 2,4-diisocyanate, polymethylene pblyphenyl diisocyanate, hexamethylene diisocyanate, and polyaryl polyisocyanate (available commercially under the trademark PAPI). The isocyanate compound may be mixed in an organic solvent such as toluene or methyl ethyl ketone. It is also possible to use a blocked polyisocyanate formed by blocking isocyanate groups of a polyisocyanate by reacting the isocyanate compound, described above, with a blocking agent such as phenols, tertiary alcohols, and secondary alcohols.

The second rubber layer 45 functions as a surface layer to reduce the coefficient of friction. This layer 45 is blended with fluorine resin powder 40 or a lubricant other than the fluorine resin powder 40. The second rubber layer 45 may be formed, similarly to the first rubber layer 44, by dissolving a rubber blend, of the same kind as that used for the belt main body, into a solvent such as methyl ethyl ketone (MEK), or toluene, and adding a fluorine resin powder or a lubricant, other than the fluorine resin powder 40, to form a treating liquid. The treating liquid is coated and then solidified by drying. The lubricant may include one or more of a layered graphite structure, molybdenum sulfide, glass beads, ceramic powder, spheroidal phenol resin powder, as well as cut yarn or powder made from aramid, polyamide, polyester, or polybenzoxazole fibers. Graphite is particularly compatible with the rubber ingredient and is effective as a durable lubricant.

There is no specific restriction on the material of the rubber blend used to form the belt bodies 12, 48, with the rubber blend thus being chosen depending upon the operating environment and performance requirements. For toothed belts used on automobile engines and other kinds of engines, H-NBR, CR, and CSM, having good heat and oil resistance, are desired. For toothed belts used in general industrial machines, any of NBR, ethylene-propylene diene monomer (EPDM), ethylene-propylene copolymer (EPR), SBR, isoprene rubber (IR), natural rubber (NR), fluororubber, and silicon rubber can be used in addition to H-NBR, CR, and CSM.

For V-belts (including V-ribbed belts) used in general industrial machines and automobiles, rubber blends such as CR, H-NBR, CSM, NR, and SBR are preferred. With V-belts, a cloth layer is applied to the back surface. The cloth layer is prepared by using an RFL impregnation deposition treatment, as previously described, and further by treating the surface with a rubber cement or wiping or coating a surface treating rubber by a calender roll. The cloth layer on the back of the belt tends to extend the working life by enhancing wear properties when the back surface of the belt is contacted with a drive, driven, or idler pulley. Further, the layer tends to reduce sound resulting from the contact between the belt back surface and a cooperating pulley.

There. is no particular restriction on the composition of the load carrying cords 22, 60. Glass or aramid load carrying cords may be used. Further, twisted cords such as those consisting of at least one of polybenzoxazole, polyparaphenylene naphthalate, polyester, acryl, carbon, and steel may be used. Glass cords may be either E glass or S glass (high strength glass). There is no particular restriction with respect to the diameter of the filaments, the number of filaments bundled, or the number of strands. Further, there is no particular restriction on the adhesive treating agent, sizing material used as the protecting material for glass filaments upon flexing, the RFL, or the overcoat agent.

There is also no particular restriction on the aramid cords with respect to the difference of the molecular structure of the material, constitution of the cords, diameter of the filaments, or the composition of the adhesion treating agent. Similarly, twisted cords could have other constructions and compositions.

With the above described structure, a substantial amount of fluorine resin powder 40 can be dispersed in the fiber material by situating the rubber ingredient 36, the resin adhesive ingredient 38, and the unbonded fluorine resin powder at the surfaces 41, 42 and therebetween both as a tooth and back surface covering, as shown for the belts 10, 46.

The resin adhesive ingredient 38 tends to improve adhesion to the belt body, or the like, and retains the fluorine resin powder 40 that is unbonded to the rubber ingredient 36 and the resin adhesive ingredient 38. Accordingly, it is not necessary that the rubber ingredient 36 impregnated and deposited on the fiber material be the same as that for the belt body 12, 48, and thus the rubber can be selected depending upon the working environment and the desired belt qualities.

The unbonded fluorine resin powder can migrate between the surfaces 41, 42 of the fiber/cloth layers 24, 56 so that substantial amounts of the fluorine resin powder remains exposed to reduce the coefficient of friction between the fiber/cloth layers 24, 56 and a cooperating surface, as on a pulley, through a substantial running life.

The invention can be explained more specifically by way of example. These examples should not be viewed as limiting.

Fiber materials were prepared with a composition as shown in Table 1, below.

TABLE 1

| Fabric No. | | A-1 | A-2 | A-3 | A-4 |
|---|---|---|---|---|---|
| Composition | Weft | Nylon 6,6 + urethane yarn | TECHNORA + urethane yarn | Polyester + urethane yarn | PBO + urethane yarn |
| | Warp | Nylon 6,6 | Nylon 6,6 | Nylon 6,6 | Nylon 6,6 |
| Constitution | Weft | 420 d | 400 d | 400 d | 500 d |
| of yarn | Warp | 210 d | 210 d | 250 d | 210 d |
| Density | Weft | 110 | 120 | 120 | 110 |
| (Number/5 cm) | Warp | 100 | 100 | 100 | 100 |
| Weave constitution | | Twill | Satin | Twill | Twill |

Urethane yarn: Shrinkable yarn prepared by stretching an elastic urethane yarn of 140 d by about 3 times and twisting it with other raw material yarns.
TECHNORA: PARA type aramid fiber manufactured by Teijin Co., Ltd.
PBO: Polybenzoxazole fiber Rubber blends, as shown in Table 2, below, were kneaded.

TABLE 2

| Blending No. | B-1 | B-2 | B-3 | B-4 |
|---|---|---|---|---|
| HNBR | 100 | | | |
| CR | | 100 | | |
| CSM | | | 100 | |
| EPT | | | | 100 |
| Zinc White | 5 | 5 | 0 | 5 |
| Magnesia | 0 | 5 | 5 | 0 |
| Setaric acid | 1 | 1 | 1 | 1 |
| Plasticizer DOS | 5 | 5 | 5 | |
| Paraffin type process oil | | | | 5 |
| Carbon black FEF | 40 | 40 | 40 | 40 |
| Aging inhibitor | 2 | 2 | 2 | 2 |
| N,N-m-phenylene dimaleimide | | | 1.5 | |
| Accelerator TT | 2 | | | 1 |
| Accelerator CM | 1 | | | 1 |
| Accelerator TRA | | | 1 | |
| Sulfur | 0.5 | | | 1 |
| Total | 156.5 | 158 | 156.5 | 156 |

RFL liquids, as shown in Table 3, below, were prepared.

TABLE 3

| Pretreatment liquid No. | C-1 | C-2 | C-3 | C-4 | C-5 | C-6 | C-7 | C-8 | C-9 | C-10 | C-11 | C-12 |
|---|---|---|---|---|---|---|---|---|---|---|---|---|
| Resorcinol | 110 | 110 | 110 | 110 | 110 | 110 | 110 | 110 | 110 | 110 | 110 | 110 |
| Formalin | 81 | 81 | 81 | 81 | 81 | 81 | 81 | 81 | 81 | 81 | 81 | 81 |
| Sodium Hydroxide | 2 | 2 | 2 | 2 | 2 | 2 | 2 | 2 | 2 | 2 | 2 | 2 |
| HNBR latex (40%) | 1400 | 1400 | 1400 | 1400 | 1400 | 1400 | 1400 | 1400 | | | | |
| VR latex (40%) | | | | | | | | | 1400 | 1400 | | |
| CR latex (40%) | | | | | | | | | | | 1400 | |
| CSM latex (40%) | | | | | | | | | | | | 1400 |
| FLUON ADI (60%) | | 93 | 280 | 935 | 1870 | | | | | 935 | 935 | 935 |
| FLUON L173J | | | | | | 560 | | | | | | |
| FLUON G190 | | | | | | | 560 | | | | | |
| FLUON G350 | | | | | | | | 560 | | | | |
| Water | 3087 | 3050 | 3927 | 5892 | 10387 | 6260 | 6260 | 6260 | 3087 | 5892 | 5892 | 5892 |
| Total | 4680 | 5052 | 5800 | 8420 | 12160 | 8413 | 8413 | 8413 | 4680 | 8420 | 8420 | 8420 |
| PTFE amount based on 100 rubber ingredient in latex | 0 | 10 | 30 | 100 | 200 | 100 | 100 | 100 | 0 | 100 | 100 | 100 |

FLUON ADI: Aqueous dispersion of polytetrafluoroethylene having an average diameter of 0.25 μm, 60% solid content, manufactured by Asahi ICI Fluoropolymers Co., Ltd.

TABLE 3-continued

| Pretreatment liquid No. | C-1 | C-2 | C-3 | C-4 | C-5 | C-6 | C-7 | C-8 | C-9 | C-10 | C-11 | C-12 |
|---|---|---|---|---|---|---|---|---|---|---|---|---|

FLUON L173J: Aqueous dispersion of polytetrafluoroethylene having an average diameter of 7 μm, manufactured by Asahi ICI Fluoropolymers Co., Ltd.
FLUON G190: Aqueous dispersion of polytetrafluoroethylene having an average diameter of 25 μm, manufactured by Asahi ICI Fluoropolymers Co., Ltd.
FLUON G350: Aqueous dispersion of polytetrafluoroethylene having an average diameter of 350 μm, manufactured by Asahi ICI Fluoropolymers Co., Ltd.
PTFE: Polytetrafluoroethylene Rubber cement solutions, as in Table 4, below, were prepared.

TABLE 4

| Pretreatment liquid No. | D-1 | D-2 | D-3 | D-4 | D-5 | D-6 | D-7 | D-8 |
|---|---|---|---|---|---|---|---|---|
| Rubber blend B-1 | 156.5 | 156.5 | 156.5 | 156.5 | 156.5 | | | |
| Rubber blend B-2 | | | | | | 158 | | |
| Rubber blend B-3 | | | | | | | 156.5 | |
| Rubber blend B-4 | | | | | | | | 156 |
| Toluene | | | | | | 1462 | 1454 | 1451 |
| MEK | 887 | 1454 | 1454 | 1454 | 1454 | | | |
| FLUON 169J (13 μm) | | 100 | | | | | | |
| Molybdenum disulfide | | | 100 | | | | | |
| Graphite | | | | 100 | | | | |
| Aramid fiber powder | | | | | 50 | | | |
| Total | 1043.5 | 1710.5 | 1710.5 | 1710.5 | 1710.5 | 1620 | 1610.5 | 1607 |
| Amount of additive based on 100 rubber ingredient | 0 | 100 | 100 | 100 | 100 | | | |

FLUON L169J: Polytetrafluoroethylene, average grain size 13 μm.

EXAMPLE A

Fiber materials shown in Table 1 were dipped in an RFL treating liquid containing a fluorine resin powder, dried at 120° C., and thereafter heated at 180° C. for two minutes. After the RFL treatment, the fiber materials were dipped in a treating liquid made by dissolving the rubber blends shown in Table 2 in MEK or toluene. Polyaryl isocyanate (sold commercially under the trademark PAPI) was added to the dissolved rubber blends as the isocyanate compound, to form a first rubber layer. Using the treating liquid blend in Table 4, 20 parts by weight of an anti-aging agent, NOC-RACK NBC were added to 100 parts by weight of the rubber blends in Table 2 to prepare treating liquids. The rubber blend and the NOCRACK NBC were present at about 15% based on the mixed liquid in MEK or toluene to form a treating liquid, to which a fluorine resin powder, graphite, or molybdenum disulfide was added and mixed to prepare a treating liquid. Fiber material, with the first rubber layer formed thereon, was dipped in the treating liquid and dried to form a second rubber layer to complete a fiber/cloth layer for covering the belt body.

The fiber/cloth layer was wound around a belt manufacturing mold. SZ-twisted pair load carrying cord, treated with RFL and isocyanate in Table 5, below, (glass fiber: 1.2 mm diameter) were spirally wound under a predetermined tension at a predetermined pitch (1.4 mm) around the fiber/cloth layer. Rubber sheets each of 2.5 mm thickness, made up of the blend shown in Table 2, were then wrapped around the fiber/cloth layer and load carrying cord to form a belt sleeve subassembly.

TABLE 5

| Core wire | E-1 | E-2 | E-3 |
|---|---|---|---|
| Composition | E glass | TECHNORA | PBO |
| Raw yarn | ECG 150 | 1500d | 1000d |
| Constitution of strand | 3/13 | 1 × 4 | 2 × 3 |
| Core wire diameter (mm) | 1.2 | 1.1 | 1.1 |
| Treatment | RFL + isocyanate | — | — |

The belt sleeve subassembly was placed into a vulcanizing can, with teeth then formed using a conventional press method. The sleeve subassembly was then vulcanized at 160° C. for 30 minutes under pressure. The belt back surface was polished to a predetermined thickness and thereafter the sleeve subassembly was cut to predetermined widths to produce finished toothed belts.

The resulting belts had a 15 mm width and 105 Y-shaped belt teeth (8.0 mm pitch). This belt construction is identified as 105Y15.

Figure 4:
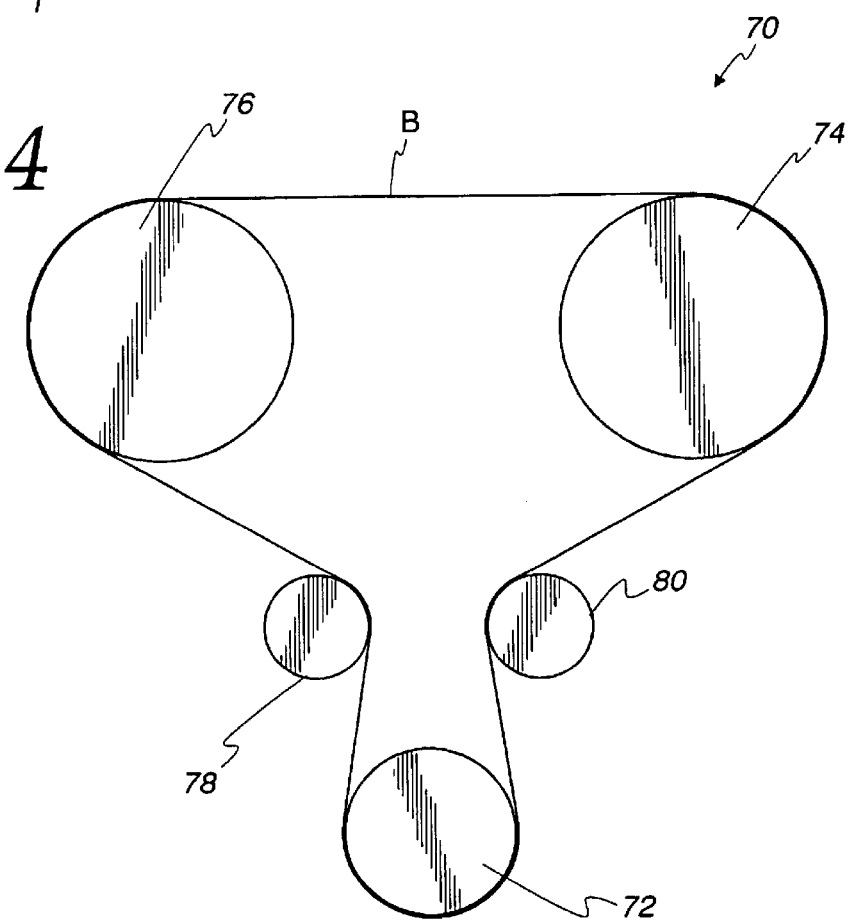
FIG. 4 is a schematic representation of a dynamic testing device used to test belts in operation.

Duration running testing was carried out under high load, high tension, and in a high temperature environment using a running test device, as shown at 70 in FIG. 4. The test device 70 consisted of a drive pulley 72 having 19 teeth and driven pulleys 74, 76, each having 38 teeth. The drive pulley 72 was rotated at 7200 rpm under a load of 7.5 kW under an initial tension of 350 N and at an atmospheric temperature of 130° C. Auto tensioners 78, 80 which were pressed against the belts B trained around the pulleys 72, 74, 76.

The life of the individual belts and the manner of failure is summarized in Tables 6–8, below.

TABLE 6

|  | Example 1 | Example 2 | Example 3 | Example 4 | Example 5 | Example 6 | Example 7 | Example 8 |
|---|---|---|---|---|---|---|---|---|
| Tooth cloth | A-1 | ← | ← | ← | ← | ← | ← | ← |
| RFL treating liquid | C-3 | C-4 | C-5 | C-6 | C-7 | C-10 | C-11 | C-12 |
| Rubber cement treating liquid | D-1 | ← | ← | ← | ← | ← | ← | ← |
| RFL deposition amount (%) | 27 | 29 | 23 | 28 | 28 | 25 | 22 | 25 |
| Rubber blend | B-1 | ← | ← | ← | ← | ← | ← | ← |
| Load carrying cord | E-1 | ← | ← | ← | ← | ← | ← | ← |
| Running life at high load (hr) | 147 | 154 | 155 | 160 | 155 | 172 | 178 | 175 |
| Failure mode running at 130° C. | Chip by root wear | ← | ← | ← | ← | ← | ← | ← |
| Material of tooth fiber/cloth layer | Nylon 6,6 | ← | ← | ← | ← | ← | ← | ← |
| RFL latex | HNBR | ← | ← | ← | ← | VP | CR | CSM |
| RFL additive | AD1(30) Deposition amount 9% | AD1(100) Deposition amount 9% | AD1(200) Deposition amount 9% | L173(100) Deposition amount 9% | G190(100) Deposition amount 9% | AD1(100) Deposition amount 9% | ← | ← |
| Rubber cement additive | None | ← | ← | ← | ← | ← | ← | ← |
| Rubber blend | HNBR | ← | ← | ← | ← | ← | ← | ← |
| Load carrying cord | E glass | ← | ← | ← | ← | ← | ← | ← |

TABLE 7

|  | Example 9 | Example 10 | Example 11 | Example 12 | Example 13 | Example 14 |
|---|---|---|---|---|---|---|
| Tooth Fiber/cloth Layer | A-1 | ← | ← | ← | ← | A-2 |
| RFL treating liquid | C-3 | C-4 | ← | ← | ← | C-10 |
| Rubber cement treating liquid | D-1 | D-2 | D-3 | D-4 | D-5 | D-6 |
| RFL deposition amount (%) | 10 | 21 | 18 | 24 | 21 | 25 |
| Rubber blend | B-1 | ← | ← | ← | ← | B-2 |
| Load carrying cord | E-1 | ← | ← | ← | ← | E-2 |
| Running life at high load (hr) | 176 | 164 | 147 | 170 | 145 | 157 |
| Failure mode running at 130° C. | Chip by root wear | ← | ← | ← | ← | ← |
| Material of tooth fiber/cloth layer | Nylon 6,6 | ← | ← | ← | ← | TECHNORA cloth |
| RFL latex | HNBR | ← | ← | ← | ← | ← |
| RFL additive | AD1(30) Deposition amount 6% | AD1(100) Deposition amount 9% | ← | ← | ← | ← |
| Rubber cement additive | None | Cement PTFE | Cement MoS₂ | Cement graphite | Cement aramid | None |
| Rubber blend | HNBR | ← | ← | ← | ← | CR |
| Load carrying cord | E glass | ← | ← | ← | ← | TECHNORA |

TABLE 8

|  | Example 15 | Example 16 | Example 17 | Comparative Example 1 | Comparative Example 2 | Comparative Example 3 | Comparative Example 4 |
|---|---|---|---|---|---|---|---|
| Tooth fiber/cloth layer | A-3 | ← | A-1 | ← | A-2 ← | A-3 | A-4 |
| RFL treating liquid | C-4 | C-8 | C-2 | C-1 | C-9 | ← | ← |
| Rubber cement treating liquid | D-1 | ← | ← | ← | D-6 | D-7 | D-8 |
| RFL deposition amount (%) | 4 | 23 | 26 | 24 | 20 | 19 | 21 |
| Rubber blend | B-4 | ← | B-1 | ← | B-2 | B-3 | B-4 |
| Load carrying cord | E-3 | ← | E-1 | ← | E-2 | E-3 | ← |
| Running life at high load (hr) | 86 | 81 | 80 | 77 | 73 | 43 | 94 |
| Failure mode running at 130° C. | Chipping by root wear | ← | ← | ← | Chipping by pressure surface wear | Chipping by tooth bottom wear | ← |
| Material of tooth fiber/cloth layer | Nylon 6,6 | ← | ← | ← | Aramid | PET | PBO |

TABLE 8-continued

|  | Example 15 | Example 16 | Example 17 | Comparative Example 1 | Comparative Example 2 | Comparative Example 3 | Comparative Example 4 |
|---|---|---|---|---|---|---|---|
| RFL latex | HNBR | ← | ← | ← | VP | ← | ← |
| RFL additive | AD1(30) Deposition amount 4% | G350(100) 350 μm Deposition amount 9% | AD1(10) Deposition amount 9% | None | ← | ← | ← |
| Rubber cement additive | None | ← | ←← | ← | ← | ← | ← |
| Rubber blend | HNBR | ← | ← | ← | CR | CSM | EPT/SBR |
| Load carrying cord | E glass | ← | ← | ← | TECHNORA | PBO | ← |

In Examples 1–3 and Comparative Example 1, it can be seen that the running life under high load running is extended significantly using nylon fabrics treated with RFL treating liquids using H-NBR latex and adding the fluorine resin powder,(sold commercially under the trademark FLUON AD1). In Examples 1–3, the effect is significant with the fluorine resin powder added in 30 to 200 parts by weight per 100 by weight of the rubber ingredient in the fiber material. In Examples 1–5, Example 16, and Comparative Example 1, the effect is greater as the grain size of the fluorine resin powder added to the RFL treating liquid is reduced. With the grain size at 350 μm, as in Example 16, the dispersion of the powder in the RFL treating liquid is insufficient and the effect is reduced compared with Examples 1–5 using smaller grain size. The effect can be improved to some degree compared with that of Comparative Example 1 with no addition of the fluorine resin powder. In Example 9 and Example 15, the concentration of the RFL treating liquids containing the fluorine resin powderwas lowered to control the deposition amount obtained by comparing the weight of the tooth fiber/cloth layer before and after impregnation coating, drying, and heat treatment to 6% and 4%, respectively. Since a significant effect is realized by a 6% deposition, but the effect remains at a lower level with 4% deposition, the addition of at least 5% is preferred.

In Examples 6–8, the rubber ingredient in the RFL treating liquid was changed. The effect is recognizable for any of the rubber ingredients VP, CR, and CSM for the tooth cloth. In Examples 10–13, the effect was confirmed for the fluorine resin powder-containing tooth fiber/cloth layer which additionally had applied thereto a rubber cement treatment by adding the fluorine resin powder and other lubricant as the additive in the rubber cement of the H-NBR blend. Those with fluorine resin powder, molybdenum disulfide, graphite, and aramid fiber powder as the additive to the rubber cement, had a further increased belt working life. In Examples 14–16 and Comparative Examples 2–4, the effect is shown for any of fabrics of aramid, polyester, and PBO, as the composition of the tooth fiber cloth/layer with the RFL treating liquids containing the fluorine resin powder impregnated and deposited. Further, the effect is recognizable for the rubber blends of any of CR, CSM, and EPT as the rubber ingredients in the rubber of the belt body. As to the load carrying cords, the effect is also obtained by using load carrying cords consisting of aramid or PBO, in addition to glass.

The foregoing disclosure of specific embodiments is intended to be illustrative of the broad concepts comprehended by the invention.

What is claimed is:

1. A power transmission belt comprising:
   a body comprising rubber and having an exposed outer surface;
   a fiber layer on at least a part of the exposed outer surface of the body; and
   a mixture comprising a resin adhesive ingredient, a rubber ingredient, and a lubricant comprising a fluorine resin powder that is applied to the fiber layer so that the fluorine resin powder is exposed to contact a surface against which the power transmission belt acts and affect frictional characteristics of the fiber layer,
   the resin adhevsive ingredient, rubber ingrediant, and fluorine resin powder not bonded such that a gap is formed partially or entirely around the flourine resin powder.

2. The power transmission belt according to claim 1 wherein the power transmission belt comprises a V-belt.

3. The power transmission belt according to claim 1 wherein the power transmission belt comprises a plurality of teeth.

4. The power transmission belt according to claim 3 wherein the body comprises a back portion in which at least one load carrying cord is embedded, a back surface, and an inside surface facing oppositely to the back surface, and the fiber layer covers the teeth on the inside surface.

5. A power transmission belt comprising:
   a body comprising rubber and having an exposed outer surface;
   a fiber layer on at least a part of the exposed outer surface of the body; and
   a mixture comprising a resin adhesive ingredient, a rubber ingredient, and a lubricant comprising a fluorine resin powder that is applied to the fiber layer so that the fluorine resin powder is exposed to contact a surface against which the power transmission belts acts and affect frictional characteristics of the fiber layer,
   wherein the fiber layer has a first surface which is exposed and a second surface which is applied to the body, and the mixture is applied so that the at least the flourine resin powder is present at the first and second surfaces and between fibers in the fiber layer between the first and second surfaces.

6. The power transmission belt according to claim 5 wherein fibers in the fiber layer are surrounded by the mixture between the first and second surfaces.

7. The power transmission belt according to claim 5 wherein at least one of the resin adhesive ingredient and the rubber ingredient are formed by drying a resorcinol-formalin-rubber latex treating liquid.

8. The power transmission belt according to claim 5 wherein the flourine resin powder is present in an amount of from 30 to 200 parts by weight per 100 parts by weight of the rubber ingredient, the fluorine resin powder comprises grains with an average size of no greater than 100 μm, and the mixture is present in an amount of 5% to 40% by weight of fiber in the fiber layer.

9. The power transmission belt according to claim 5 wherein the power transmission belt comprises a first rubber layer on the fiber layer, said first rubber layer comprising a rubber blend comprising a isocyanate compound.

10. The power transmission belt according to claim 9 wherein the rubber in the first rubber layer is the same as the rubber in the body.

11. The power transmission belt according to claim 5 wherein the fiber layer comprises at least one of a) non woven fabric, b) knitted fabric, and c) fabric made from woven yarns made from fibers.

12. A power transmission belt comprising:
   a body comprising rubber and having an exposed outer surface;
   a fiber layer on at least a part of the exposed outer surface of the body; and
   a mixture comprising a resin adhesive ingredient, a rubber ingredient, and a lubricant comprising a fluorine resin powder that is applied to the fiber layer so that the fluorine resin powder is exposed to contact a surface against which the power transmission belt acts and affect frictional characteristics of the fiber layer,
   wherein the fiber layer has a first surface which is exposed and a second surface which is applied to the body, and the mixture is applied so that at least the fluorine resin powder is present at the first and second surface and between fibers in the fiber layer between the first and second surfaces,
   wherein the fluorine resin powder is not bonded to either of the resin adhesive ingredient and the rubber ingredient.

13. A power transmission belt comprising:
   a body comprising rubber and having an exposed outer surface;
   a fiber layer on at least a part of the exposed outer surface of the body; and
   a mixture comprising a resin adhesive ingredient, a rubber ingredient, and a lubricant comprising a fluorine resin powder that is applied to the fiber layer,
   wherein the fiber layer has a first surface which is exposed and a second surface which is applied to the body, and the mixture is applied so that at least the fluorine resin powder is present at the first and second surfaces and between fibers in the fiber layer between the first and second surfaces,
   wherein the power transmission belt comprises a first rubber layer on the fiber layer, said first rubber layer comprising a rubber blend comprising an isocyanate compound,
   wherein the power transmission belt comprises a second rubber layer on the first rubber layer, said second rubber layer comprising at least one of a) a fluorine resin powder, and b) a second lubricant other than the fluorine resin powder.

14. The power transmission belt according to claim 13 wherein the second lubricant comprises graphite.

15. The power transmission belt according to claim 13 wherein the rubber in the second rubber layer is the same as the rubber in the body.

* * * * *